Figure 1:
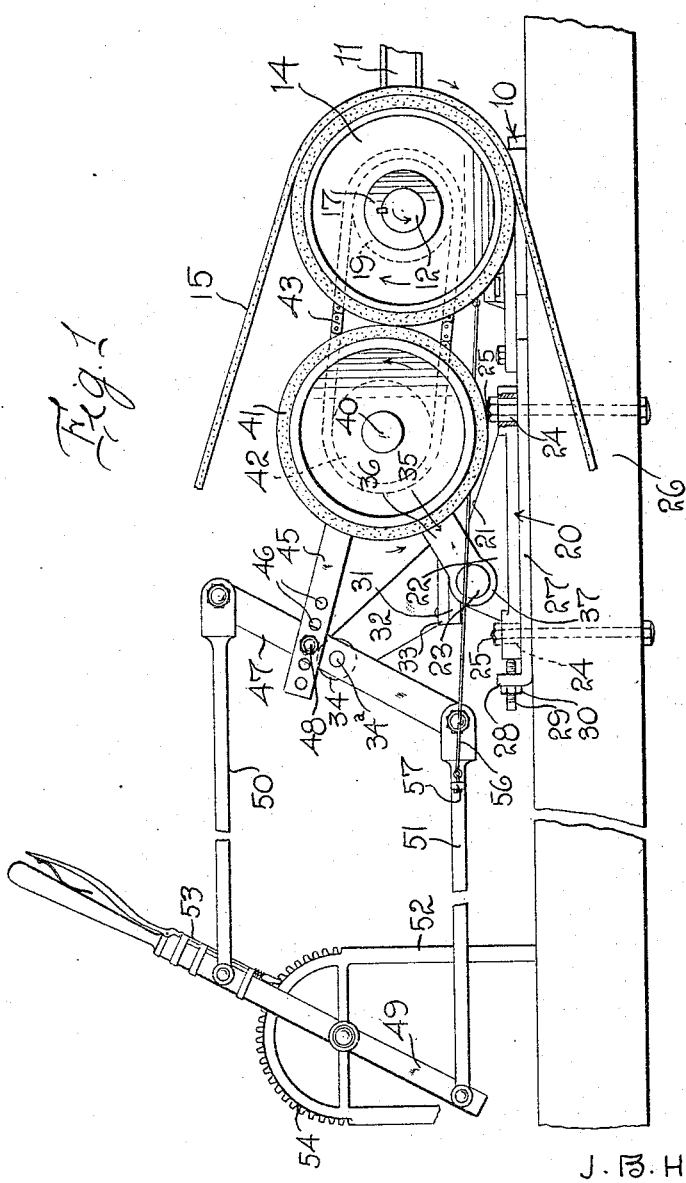

J. B. HADDEN.
FRICTION REVERSING GEAR FOR GAS ENGINES.
APPLICATION FILED JAN. 15, 1916.

1,199,372.

Patented Sept. 26, 1916.

2 SHEETS—SHEET 1.

Inventor

J. B. HADDEN

By Watson E. Coleman

Attorney

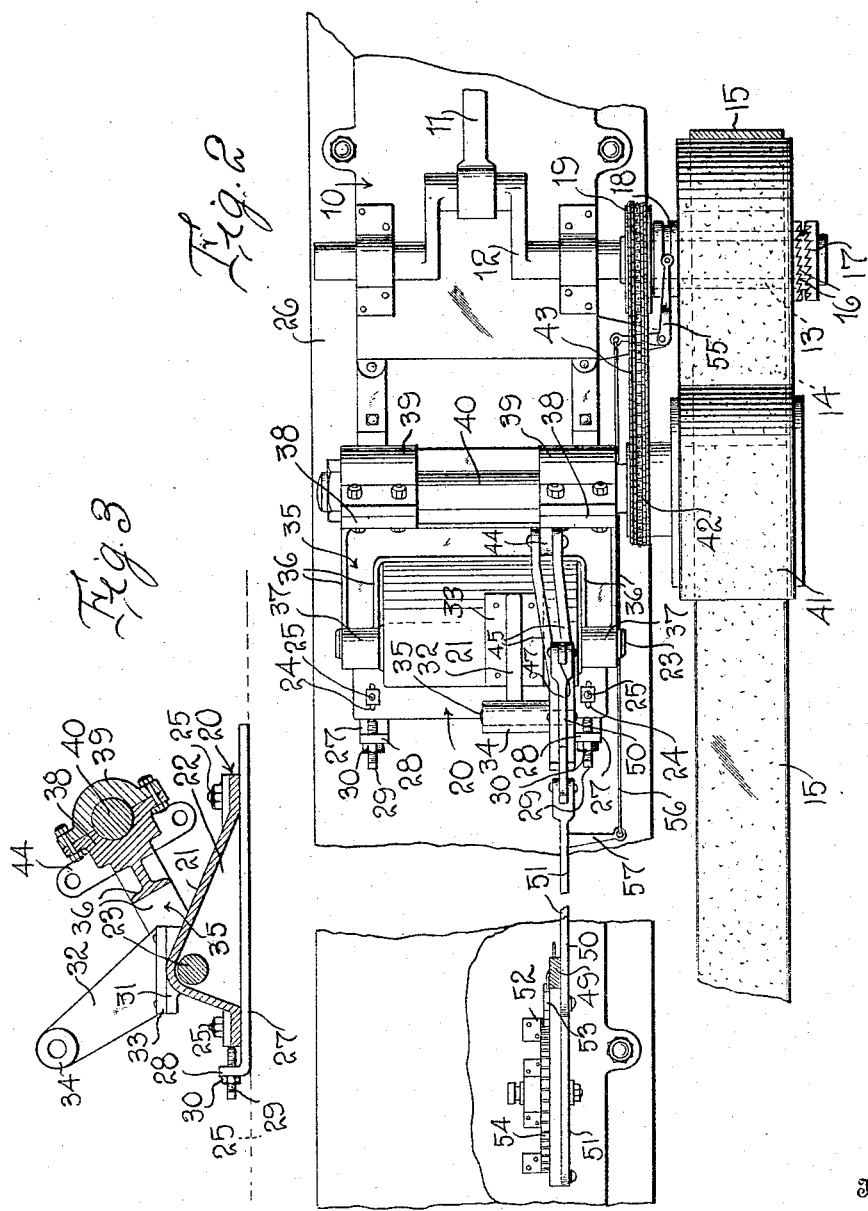

UNITED STATES PATENT OFFICE.

JOHN B. HADDEN, OF SHEFFIELD, PENNSYLVANIA.

FRICTION REVERSING-GEAR FOR GAS-ENGINES.

1,199,372.  Specification of Letters Patent. Patented Sept. 26, 1916.

Application filed January 15, 1916. Serial No. 72,261.

*To all whom it may concern:*

Be it known that I, JOHN B. HADDEN, a citizen of the United States, residing at Sheffield, in the county of Warren and State of Pennsylvania, have invented certain new and useful Improvements in Friction Reversing-Gear for Gas-Engines, of which the following is a specification, reference being had to the accompanying drawings.

My invention relates to transmission mechanism, and particularly to a reversing gear particularly designed for use with gas engines as used in oil fields.

The general object of my invention is to provide a very simple form of reversing transmission gearing whereby the direction of rotation of the transmission pulley and belt transmitting power from the engine may be readily reversed, and still another object is to provide a reversing mechanism in the form of an attachment which may be used in connection with any engine having a normally directly driven transmission pulley.

A further object of my invention is the provision of a transmission mechanism which may be readily applied to engines already in use and which requires no additional foundation as it is attached to the same block to which the engine is attached, and further which is so constructed that it requires no out-board bearing requiring additional foundation.

A further object of the invention is to provide transmission gearing of the character described which puts no additional strain on the engine shaft, has no delicate parts or pinions to wear out, is relatively light and thoroughly effective and serviceable in action.

A further object is to provide a reversing friction gear in the form of an attachment which may be applied in connection with the regular straight-ahead clutch pulley usually found on the crank shaft of gas engines as used in oil districts.

Other objects will appear in the course of the following description.

My invention is illustrated in the accompanying drawings, wherein:

Figure 1 is a side elevation of an engine bed and the straight-ahead drive pulley thereof with my invention used in conjunction therewith; Fig. 2 is a plan view of the construction illustrated in Fig. 1; Fig. 3 is a section through the supporting plate or base and the reverse pulley supporting arm.

Referring particularly to Figs. 1 and 2, 10 designates the base plate of an engine of any suitable form but assumed to be a gas engine of the type commonly used in oil producing countries. This bed plate has mounted upon it any suitable engine which engine is connected by means of a connecting rod 11 to the crank shaft 12. This crank shaft has mounted upon it a sleeve 13 shown in dotted lines in Fig. 2, this sleeve being loose upon the crank shaft and carrying upon it the pulley 14 over which passes the belt 15, the belt having divergent upper and lower flights. This belt passes over a relatively large band wheel which is ten feet in diameter but which, however, is not illustrated. The sleeve 13 is formed at one end with clutch teeth 16 adapted to engage with the clutch member 17 mounted upon the end of the crank shaft 12. The sleeve also carries a grooved annulus 18 adapted to be engaged by a shipper lever as will be later stated. Mounted upon the crank shaft 12 is a sprocket wheel 19.

My improved attachment comprises a base which has preferably the form of a plate of relatively heavy material designated 20. This plate is rectangular in form and the central portion of the plate is bowed upward as at 21, this upwardly bowed portion having side walls 22, the walls forming bearings for a transversely extending bolt or pin 23. The four corners of the plate 20 are formed with longitudinally extending slots 24 through which bolts 25 pass into the engine block 26 as illustrated in dotted lines in Fig. 1. Disposed below the side edges of the base plate 20 and extending longitudinally are the metallic strips 27 through which said bolts 25 also pass. Each of these strips at one end is upwardly bent as at 28, and through this upwardly bent end passes an adjusting screw 29 engaged by a set nut 30, the purpose of which construction will be later stated. The upwardly bowed portion 21 at its apex and to one side of the transverse axis of the upwardly bowed portion is formed with a relatively flat table 31 as best shown in Figs. 2 and 3. Bolted to this table is a bracket 32 which at its lower end has a base 33 which immediately contacts with the table 31 and is bolted thereto. The bracket 32 extends upward and forward and at its upper end is formed with a transversely extending bearing sleeve 34 through which passes a pivot pin or bolt 34ᵃ.

Rotatably mounted upon the pin or bolt 23 is a U-shaped yoke 35 whose form is best seen in Figs. 2 and 3, this yoke having marginal flanges 36 and enlarged journal bearings 37 at its ends which rotatably engage the pin or bolt 23. The outer face of the yoke is formed at opposite ends with journal bearings 38 over which extend the complementary caps 39 which are detachably bolted thereto, and mounted in the bearings thus formed is a shaft 40 which extends parallel to the crank shaft 12 and extends out laterally and carries upon it a friction pulley 41. This friction pulley may be made of any suitable material but is preferably faced at least with paper, fiber or a composition which can have frictional engagement with the pulley 14. The shaft 40 also carries upon it a sprocket wheel 42 which is rotatably engaged with the sprocket wheel 19 by means of a sprocket chain 43. The shaft 40 will thus rotate with the crank shaft 12.

For the purpose of raising or lowering the yoke 35 and thus carrying the friction pulley 41 into or out of engagement with the friction pulley 14, I form the yoke 35 with an ear 44 and pivotally connect thereto a pair of links 45 (see Figs. 1 and 2) these links being each formed with a plurality of perforations 46. Pivotally mounted upon the bolt or pin 34ᵃ is a lever 47 having a bolt 48 which engages with any one of a pair of the perforations 46 in links 45. The lever 47 extends above and below the fulcrum pin 34ᵃ and is operatively connected to an operating or actuating lever 49 by means of the upper and lower links 50 and 51, these links being pivotally connected to the actuating lever 49 and to the lever 41. The lever 49 is operatively mounted upon any suitable supporting frame 52 and preferably carries a latch mechanism 53 engaging with the arcuate rack 54 on the frame 52. By this means the lever 49 may be shifted and held in any adjusted position. It will be obvious now that when the lever 49 is shifted to one position, as to the position shown in Fig. 1, the links 45 will force the yoke downward so as to carry the friction wheel 41 into engagement with the pulley 14, and that a reverse movement of the lever 49 will act to carry the friction wheel 47 out of engagement with the pulley 14. It is to be understood that the chain 43 is just sufficiently slack as to permit the friction wheel 41 to move upward and away from the friction wheel 14 a distance of about one-eighth of an inch just so that the friction wheel and pulley are brought out of engagement with each other. The chain will become slack to a slight degree when the friction wheels move into contact with the pulley as shown in Fig. 1, but this has no effect upon the driving transmission of the chain 43. It is of course to be understood that the links 50 and 51 may extend any desired distance. The lever 49 is situated ordinarily about forty feet from the engine and its attachments, and is located ordinarily in the derrick of the oil well drilling machine. The degree of movement of the friction wheel 41 to bring it into or out of engagement with the pulley 14 may be easily regulated. The adjustment of the friction wheel 41 relative to the pulley 14 is easily obtained by loosening the nuts on bolts 25 and then turning the screws 29 which thus secures a very delicate adjustment of the base plate 20. When the base plate has been properly adjusted, which adjustment must be so made that the face of the friction wheel 41 is parallel to the face of the pulley 14, the nuts on bolts 25 are again tightened, clamping the base plate 20 firmly down upon the engine blocks, and the set nuts 30 are again tightened so as to hold the screws 29 in their adjusted positions. The bolts 25 and the screws 29 hold the base 20 very rigidly as the base is thus tied to the engine foundation bolts by the strips 27 and tied down to the foundation by the bolts 25.

It is necessary of course that the pulley 13 should be shifted out of its clutching engagement with the clutch member 17, when the reversing friction wheel 41 is brought into contact with the pulley 14, and to the end that this may be automatically accomplished, I provide a shipper lever designated 55 which is pivotally supported in any suitable manner and which engages with the grooved annulus 18. This bell crank lever 55 is connected by means of a rod 56 and an arm 57 to the lower link 51. I do not wish to limit myself to this means of connecting the shipper lever, nor to the use of an angular shipper lever. By this construction, when the lever 49 is thrown to the position shown in Fig. 1, the link 51 will move away from the base 20 and this will cause the shipper lever to draw the sleeve 13 out of its engagement with the clutch member 17 and thus the pulley 14 will move freely upon the shaft. When, however, the lever 49 is shifted to raise the friction wheel 41 out of engagement with the pulley 14 the shipper lever will be shifted to a reverse position and the driving pulley 14 carried into engagement with the clutch and therefore into direct engagement with the crank shaft 12.

The operation of the invention will be obvious to those skilled in the art. Under ordinary circumstances the pulley 14 is driven directly from the crank shaft 12. When, however, it is desired to reverse the direction of motion of the pulley 14, the lever 49 is thrown to the position shown in Fig. 1, which disconnects the pulley 14 from the crank shaft and shifts the reversing friction wheel 41 into engagement with the pulley. This friction wheel 41 is driven directly from the crank shaft by means of the sprocket chain 43 and as a consequence when the crank shaft is turning in the direction of the arrow (Fig. 1) the friction wheel will also be turned in the direction of the conjoined arrow in Fig. 1 which will cause the rotation of the pulley 14 in a clockwise direction, in other words, a direction reverse to the direction of rotation of the crank shaft.

While other reverse gearing has been used on gas engines operating with oil drilling rigs, my reverse friction gear is an improvement over other reverse gears and clutches known to me in a number of respects. For one thing, it is an attachment which may be applied in connection with the regular straight-ahead clutch pulley, making this clutch pulley reversible in the manner heretofore described. Furthermore, my reverse gearing requires no additional foundation as it is attached to the same block that the engine rests on. It has no out-board bearing which requires additional foundation as is often the case, and it adds no additional strain on the engine shaft as there are no additional bearings to get out of line. There are no pinions or other delicate parts to wear out, and inasmuch as the entire attachment weighs approximately about 450 pounds it is relatively light, other reversing mechanisms as ordinarily used weighing from 1600 pounds to 1700 pounds. This reversing attachment may be sold relatively cheaply whereas the ordinary reversing gearing costs from $100.00 up. Furthermore, it will be seen that very little additional load is placed upon the engine, just enough to drive the shaft and friction wheel when running free from engagement with the pulley 14. This by comparison is very little, other reversing mechanisms known to me all having shoes to drag and additional bearings attached to the engine shaft directly making it very difficult to hold them in line on a wooden foundation. It is of course obvious that if the bearings are out of line there is additional strain on the bearings and on the engine crank shaft.

Having described my invention, what I claim is:

1. The combination with a driving shaft, a loose pulley thereon, and a clutch operatively connecting the loose pulley to the driving shaft, of a reversing friction wheel normally out of engagement with the loose pulley but movable into engagement therewith, a driving connection between the shaft and the friction wheel, and means for shifting the friction wheel into and out of engagement with the loose pulley and simultaneously unclutching or clutching the loose pulley to the shaft.

2. The combination with a driving shaft, a loose pulley thereon and a clutch operatively connecting the loose pulley to the driving shaft, of means for reversing the direction of rotation of the loose pulley comprising a friction wheel operatively supported to move into or out of engagement with the loose pulley, means for driving the friction wheel from the shaft, and means for clutching or unclutching the loose pulley with or from the driving shaft.

3. The combination with a driving shaft, a loose pulley thereon, and a clutch operatively connecting the loose pulley to the driving shaft for a direct drive, of means for reversing the direction of rotation of the loose pulley comprising a friction wheel, a pivotally mounted support therefor, a driving connection between the friction wheel and the driving shaft whereby the former may be driven from the latter, means for swinging the pivotal support to carry the friction wheel into or out of engagement with the loose pulley, and means for engaging the loose pulley with or disengaging it from the driving shaft.

4. The combination with a driving shaft, a loose pulley thereon and a clutch for engaging or disengaging the loose pulley with or from said shaft, of a pivotally mounted supporting member, a shaft carried thereby, a friction wheel mounted upon the shaft, driving connections between the driving shaft and the shaft carrying the friction wheel, manually operable means for shifting the supporting member to carry the friction wheel into or out of engagement with the loose pulley, and means for coincidentally shifting the clutch.

5. The combination with a driving shaft, a loose pulley thereon, and a clutch adapted to operatively connect the loose pulley to the driving shaft or disconnect it therefrom, of a base plate, a supporting member pivotally mounted upon the base plate for movement toward or from the pulley, a shaft carried upon the free end of said supporting member, a friction wheel mounted upon the shaft and adapted to be engaged with the pulley, a driving connection between the driving shaft and the second-named shaft, and manually operable means for shifting the supporting member and simultaneously operating said clutch.

6. The combination with a driving shaft, a loose pulley thereon, and a clutch whereby the loose pulley may be connected to or disconnected from the shaft, of a base plate, a yoke having arms the ends of which are pivotally connected to the base plate, the outer end of the yoke being formed to provide bearings, a shaft mounted in said bearings, a friction wheel carried upon the shaft and confronting the loose pulley, the yoke being movable to carry the friction wheel into or out of engagement with the loose pulley, sprocket wheels mounted upon both shafts, a sprocket chain connecting the sprocket wheels and permitting movement of the yoke, a lever operatively supported upon said base plate, a link connecting said lever to the free end of the yoke, and manually operable means for shifting said lever.

7. The combination with a driving shaft, a loose pulley thereon, and a clutch whereby the loose pulley may be operatively connected to the shaft or disconnected therefrom, of a reversing transmission mechanism including a base plate having longitudinal slots in its corners, a supporting member pivotally mounted upon said base plate, a shaft mounted upon the free end of the supporting member, a friction wheel mounted on the shaft and confronting the loose pulley, a driving connection between the driving shaft and said second named shaft permitting a movement of the supporting member to carry the friction wheel into or out of engagement with the loose pulley, manually operable means for shifting the supporting member and simultaneously shifting the clutch of the loose pulley, strips disposed beneath the base plate, bolts passing through the slots of the base plate and through said strips, and adjusting screws passing through the ends of the strips and bearing against the ends of the base plate.

8. The combination with a driving shaft and a power transmission member operatively connected thereto but disengageable therefrom, of a reversing mechanism including a power transmission member driven from the driving shaft, means for operatively connecting the second-named power transmission member to the first-named power transmission member, and means for operatively disconnecting the first-named power transmission member from its connection with the driving shaft.

9. The combination with a driving shaft, a loose pulley thereon, and a clutch whereby the pulley may be connected to or disconnected from the driving shaft, of means for reversing the movement of the loose pulley comprising a base having its middle portion extended upward, a pivot member passing through said upwardly extended portion, a yoke having arms engaging the ends of said pivot member, a shaft carried by the end of the yoke, a friction wheel mounted upon the shaft and confronting the loose pulley, sprocket wheels mounted upon said shafts, and a sprocket chain operatively connecting the sprocket wheels but permitting movement of the friction wheel toward or away from the loose pulley, a bracket extending upward from the base, a double-armed lever mounted upon the bracket, a link connecting one arm of said lever to the yoke, an operating lever disposed at a distance from the first named lever and parallel thereto, links connecting said levers, means for locking the operating lever in any adjusted position, and means operatively connected to said levers for shifting the clutch.

10. The combination with a driving shaft, a loose power transmission wheel thereon and a clutch operatively connecting the transmission wheel to the shaft but shiftable to disconnect it from the shaft, of a reversing mechanism including a reversing wheel normally out of operative engagement with the power transmission wheel but movable into engagement therewith, a driving connection between the reversing wheel and the driving shaft, and means for operatively connecting the reversing wheel with the power transmission wheel or disconnecting it therefrom.

11. The combination with a driving shaft, a loose pulley thereon and a clutch whereby the pulley may be connected to or disconnected from the shaft, of means for reversing the movement of the loose pulley including a base, a shaft carried upon the base for movement toward or from the driving shaft, a friction wheel carried upon the second named shaft and adapted to engage with the loose pulley, longitudinally extending strips disposed beneath the base and having upturned ends, screws passing through said upturned ends and engaging the base whereby the base may be adjusted, and bolts passing through the base and strips, the base being longitudinally adjustable relative to the strips and being held in adjusted position by said bolts.

In testimony whereof I hereunto affix my signature in the presence of two witnesses.

JOHN B. HADDEN.

Witnesses:
H. A. PINNEY,
L. WRIGHT.